United States Patent [19]

Blahut et al.

[11] Patent Number: 5,532,735
[45] Date of Patent: Jul. 2, 1996

[54] METHOD OF ADVERTISEMENT SELECTION FOR INTERACTIVE SERVICE

[75] Inventors: Donald E. Blahut, Holmdel; William M. Schell, Watchung, both of N.J.; Guy A. Story, New York, N.Y.; Edward S. Szurkowski, Maplewood, N.J.

[73] Assignee: AT&T Corp., Murray Hill, N.J.

[21] Appl. No.: 236,286

[22] Filed: Apr. 29, 1994

[51] Int. Cl.⁶ ..................................................... H04N 7/14
[52] U.S. Cl. .................. 348/13; 348/7; 455/412; 455/5.1
[58] Field of Search .................... 348/12, 13, 6, 348/7, 10; 455/4.2, 5.1, 6.1, 6.3; H04N 7/173, 7/16

[56] References Cited

U.S. PATENT DOCUMENTS 5,027,400  6/1991  Baji et al. ................................ 380/20
5,319,455  6/1994  Hoartey et al. ............................ 348/7

Primary Examiner—Victor R. Kostak
Assistant Examiner—Juan G. Acosta
Attorney, Agent, or Firm—David M. Rosenblatt

[57] ABSTRACT

Described is a technique for an interactive television ("ITV") system wherein viewers are allowed to select a desired level of advertisements with which they are provided. The technique comprises transmitting to a interactive services subscriber location a program and a set of advertisements (collectively referred to as a "show"). The set of advertisements is selected based upon an input from a user associated with the interactive services subscriber location. The input comprises an indicator of an amount of advertisements in the set of advertisements. Another feature of the ITV system described is that it allows for adjusting an amount of a bill of a subscriber to interactive television services based upon the amount of advertisements viewed in a show.

1 Claim, 4 Drawing Sheets

METHOD OF ADVERTISEMENT SELECTION FOR INTERACTIVE SERVICE

FIELD OF THE INVENTION

The invention relates to interactive television. More particularly, the invention relates to the sending of and billing for interactive shows.

BACKGROUND OF THE INVENTION

Today's world of television ("TV") comprises "broadcast" TV and conventional "cable" TV. Broadcast TV is typically called "free" TV since it is broadcast through the air and any antenna may be able to pick up broadcast signals. Conventional cable TV is a service that uses a cable as the transmission medium for signals.

A common thread between broadcast TV and conventional cable TV is that signals travel in one direction. For example, in broadcast TV the viewer cannot send a signal through the air back to the transmitter. Also, in conventional cable TV, the viewer cannot send a signal through the cable wire back to the cable TV company.

In broadcast TV and conventional cable TV, most TV shows provide advertisements to the viewing audience. A few exceptions may be, for example, premium channels on a conventional cable TV system and public TV (e.g., channel 13). However, even these "exceptions" have "advertisements" in the sense that they promote other premium channels available through the conventional cable TV system and ask viewers to make a donation to "support" the station, respectively.

Some viewers are of the opinion that advertisements provide important information about products and services. These viewers typically want to see advertisements.

Some viewers are of the opinion that advertisements are a waste of time. These viewers typically do not want to see any advertisements. Many of these viewers will tape a show on their video cassette recorder (VCR) and watch it later in about two thirds the normal viewing time by simply "fast-forwarding" through all of the advertisement.

Some viewers are willing to tolerate a few advertisements. Typically, these viewers are more interested in advertisements than some but less interested in advertisements than others.

SUMMARY OF THE INVENTION

We have invented a technique for an interactive television ("ITV") system wherein viewers are allowed to select a desired level of advertisements with which they are provided. ITV systems are similar to conventional cable TV systems in that the transmission medium is a cable rather than the air. However, in contrast to both broadcast TV and conventional cable TV wherein signals travel only in one direction, ITV systems are characterized by the capability of having signals travel in two directions (both from the ITV system to an interactive services subscriber location and from the interactive services subscriber location to the ITV system). The technique comprises transmitting to a interactive services subscriber location a program and a set of advertisements (collectively referred to as a "show"). There are a number of ways in which this may be accomplished, some of which will be mentioned in the "Detailed Description" section. The set of advertisements is selected based upon an input from a user associated with the interactive services subscriber location. For example, if the amount of advertisements is expressed as a number, such as three, the ITV system will select a set of three advertisements. Likewise, if the amount of advertisements is expressed in terms of time, such as five minutes of advertisements, the ITV system will select a set of advertisements that take approximately five minutes to display. The input comprises an indicator of an amount of advertisements in the set of advertisements. Advantageously, the ITV system allows viewers that desire to view many advertisements to so specify and thus, to view numerous advertisements. Also advantageously, the ITV system allows viewers that desire to view no advertisements to so specify and thus, view a show containing no advertisements (e.g., the "set" of advertisements is the null set). Also advantageously, the ITV system allows viewers that desire to view a few advertisements to so specify and thus, view a show with a moderate amount of advertisements.

Also advantageously, the ITV system allows for adjusting an amount of a bill of a subscriber to interactive television services based upon the amount of advertisements viewed in a show. Typically, the more advertisements that are viewed, the less the subscriber's bill will be for that show. Typically, subscribers are billed on a monthly basis.

Also advantageously, the ITV system allows for adjusting an amount of a bill of a subscriber to interactive television services based upon the level of advertisements sent to the interactive services subscriber location on a regular basis.

Other advantages of the present invention will be apparent from the drawings and the remainder of the specification.

DETAILED DESCRIPTION

ITV systems represent a great departure from previous broadcast TV systems and conventional cable TV systems. However, prior to discussing the present invention in its ITV environment, it will be useful to provide a brief description of the broadcast TV and conventional cable TV systems shown in FIGS. 1 and 2, respectively.

Figure 1:
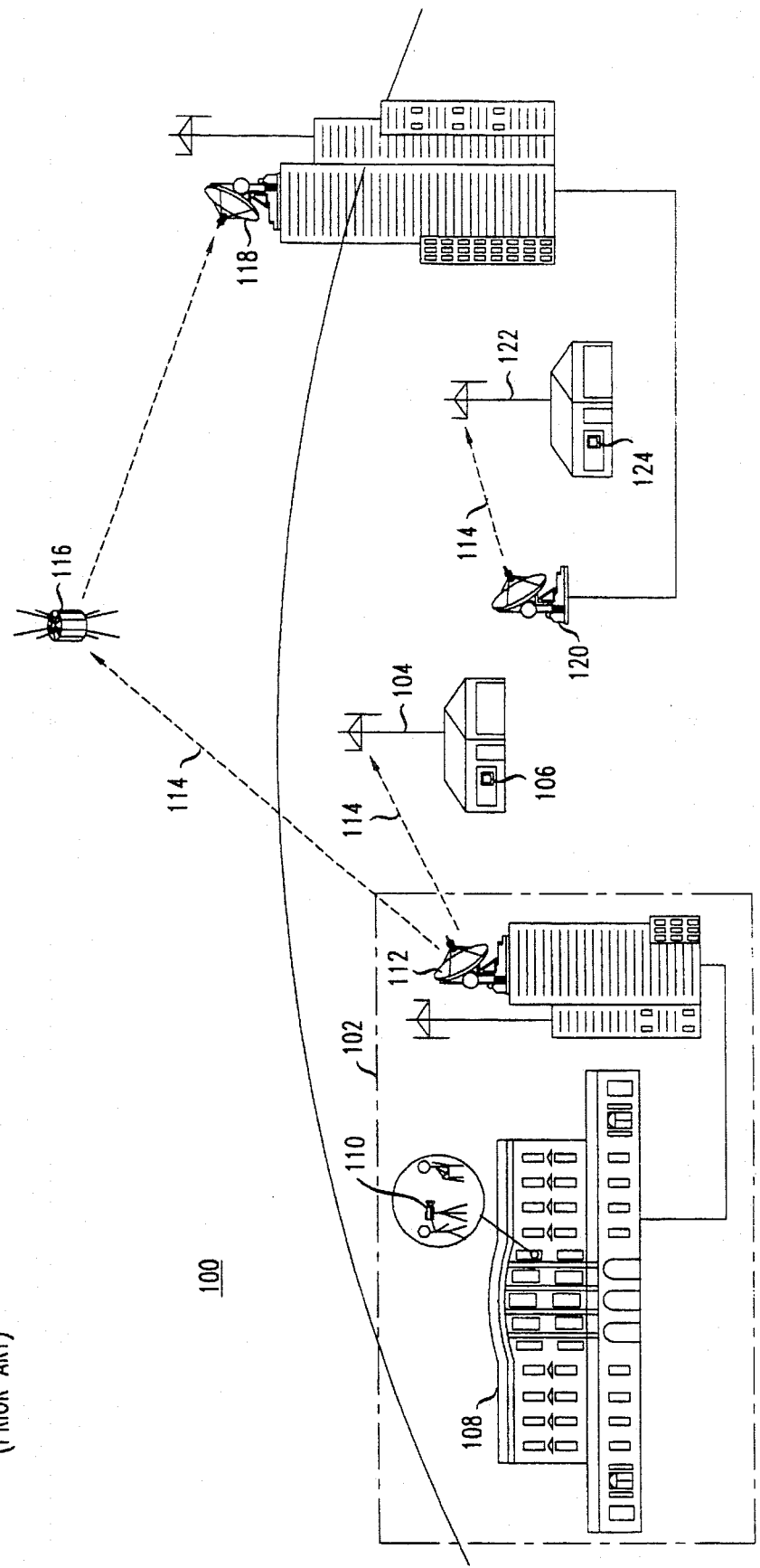
FIG. 1 shows a broadcast TV system.

FIG. 1 shows a broadcast TV system 100 comprised of a broadcast system 102, an antenna 104, and a television 106. Although there are many broadcast systems in a broadcast TV system 100 (at least one for each broadcast channel), only broadcast system 102 is shown for the sake of simplicity. Suppose one wishes to watch a presidential address from the Whim House 108 carried on broadcast TV. First, a broadcast TV station would place a camera 110 at the White House 108 to film the president. The camera 110 is connected to a transmitter 112. The transmitter 112 broadcasts signals 114. Locations in the Washington D.C. area may be able to pick up the signals 114 with the antenna 104. However, other locations, for example, in New York, would pick up the signals 114 after they have been transmitted to a satellite 116, then to a local receiver 118 in, for example, New York, then broadcast by another transmitter 120, and finally picked up by another antenna 122. Antennae 104 and 122 are connected to televisions 106 and 124, respectively. This allows a person in New York to watch the same show as a person in Washington, D.C.

Figure 2:
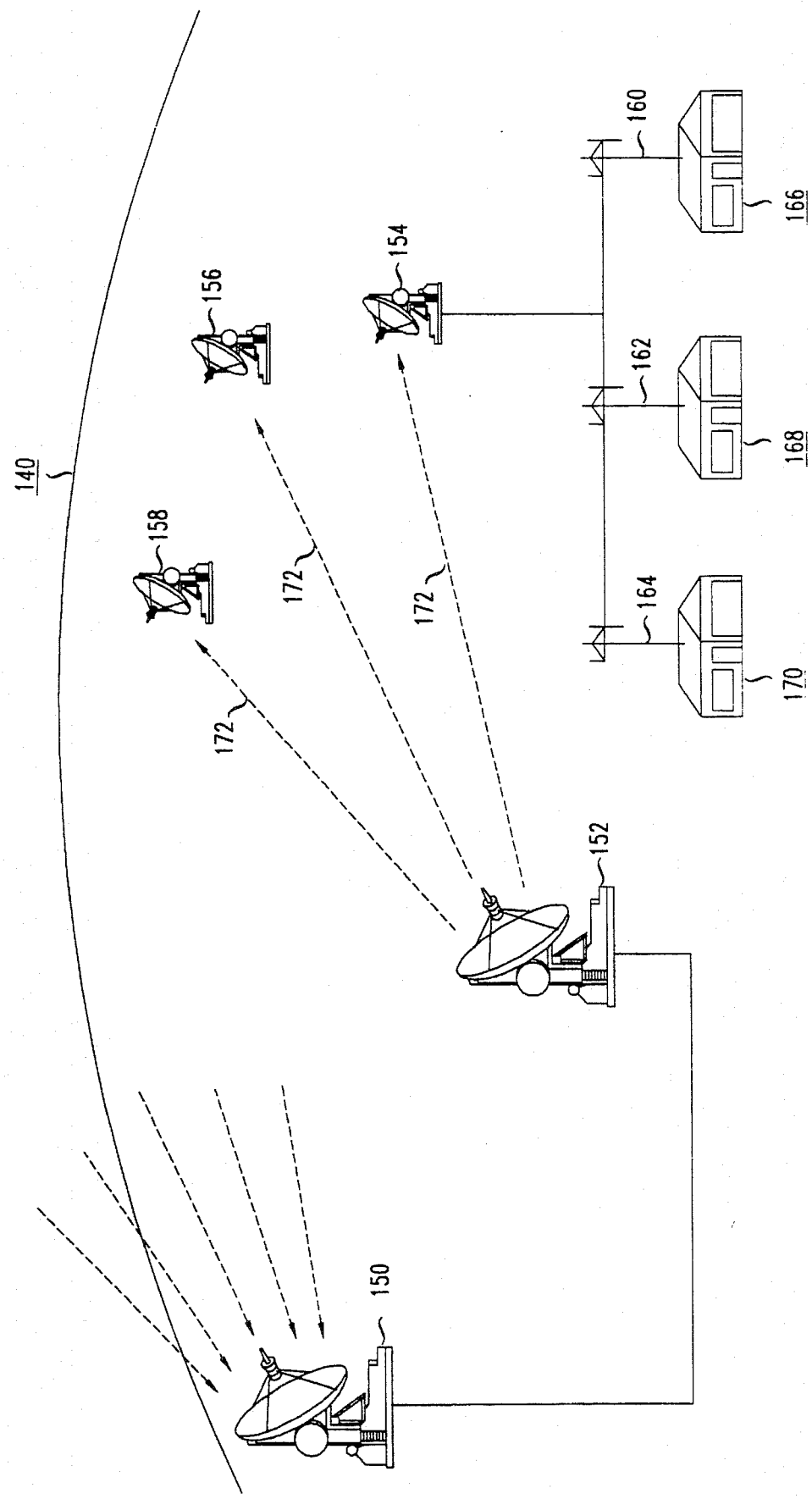
FIG. 2 shows a conventional cable TV system.

FIG. 2 shows a conventional cable TV system 140 comprised of a receiver 150, a transmitter 152, a plurality of local receivers 154, 156, 158, and a plurality of cables 160, 162, and 164, connecting local receiver 154 to a plurality of homes 166, 168, and 170. Local receivers 156 and 158 are also connected, via cables (not shown), to other homes (not shown). The receiver 150 receives signals from a plurality of broadcast systems, each similar to broadcast system 102 of FIG. 1. A combined signal 172 is formed and is transmitted by transmitter 152 to the plurality of local receivers 154, 156, and 158. The cables 160, 162, and 164 carry the combined signal 172 into homes 166, 168, and 170, respectively, where signals may be displayed and, if necessary, decoded (as is necessary with many "premium" channels such as HBO).

Figure 3:
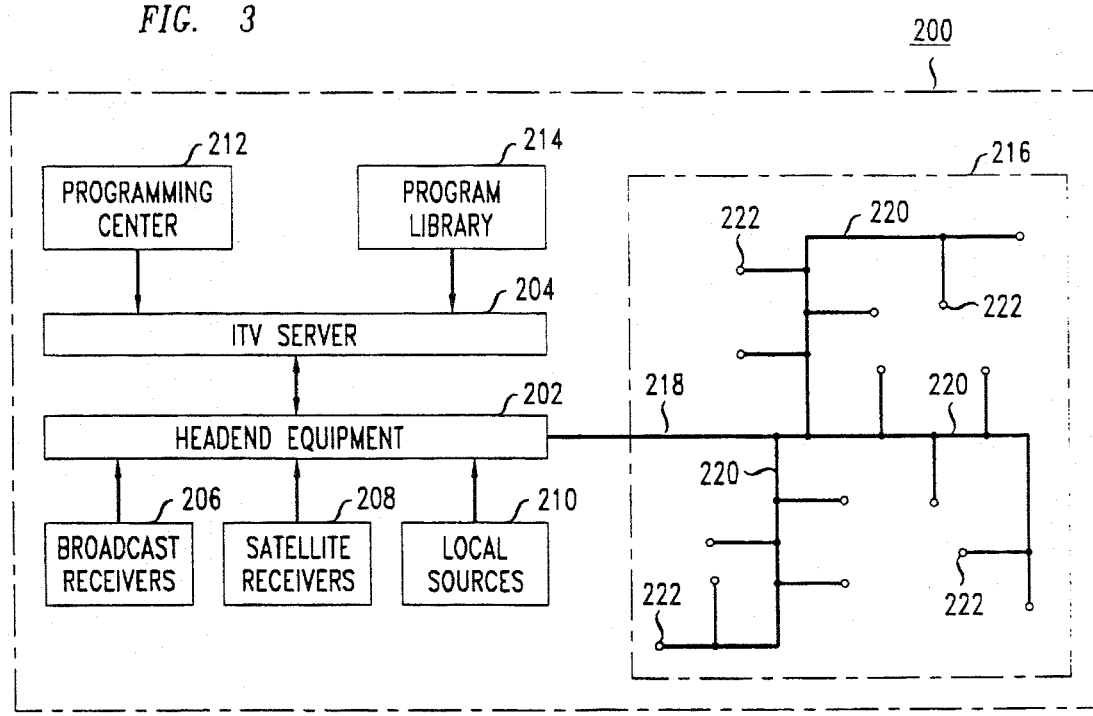
FIG. 3 shows an example of an ITV system that is capable of implementing the present invention.

FIG. 3 shows an ITV system 200 comprised of headend equipment, or headend 202, an ITV server 204, broadcast receivers 206, satellite receivers 208, local sources 210, a programming center 212, a program library 214 and a distribution network 216, all interconnected as shown. The distribution network 216 is comprised of feeders 218, branches 220 and interactive subscriber locations 222. U.S. patent application Ser. No. 07/965,492 entitled "Interactive Television Converter" filed Oct. 23, 1992 and assigned to the assignee of the present invention, which describes the ITV system 200 of FIG. 3 more fully with reference to its FIG. 1, is incorporated herein by reference as if set forth in its entirety. Also incorporated herein by reference as if set forth in their entirety are: U.S. patent application Ser. No. 08/029,205 entitled "Method And Apparatus For The Coding And Display Of Overlapping Windows With Transparency" filed Mar. 10, 1993; U.S. patent application Ser. No. 07/965,493 entitled "Interactive Television Multicasting" filed Oct. 23, 1992; U.S. patent application Ser. No. 07/965,463 entitled "Initializing Terminals In A Signal Distribution System" filed Oct. 23, 1992; U.S. patent application Ser. No. 07/997,985 entitled "Program Server For Interactive Television System" filed Dec. 28, 1992; U.S. patent application Ser. No. 08/056,973 entitled "Integrated Television Services System" filed May 3, 1993; U.S. patent application Ser. No. 08/056,974 entitled "System For Composing Multimedia Signals For Interactive Television Services" filed May 3, 1993; and U.S. patent application Ser. No. 08/175,059 entitled "Method Of Controlling Multiple Processes Using Finite State Machines" filed Dec. 29, 1993, all of which are assigned to the assignee of the present invention.

The invention will now be described with respect to a video-on-demand ("VOD") application.

Figure 4:
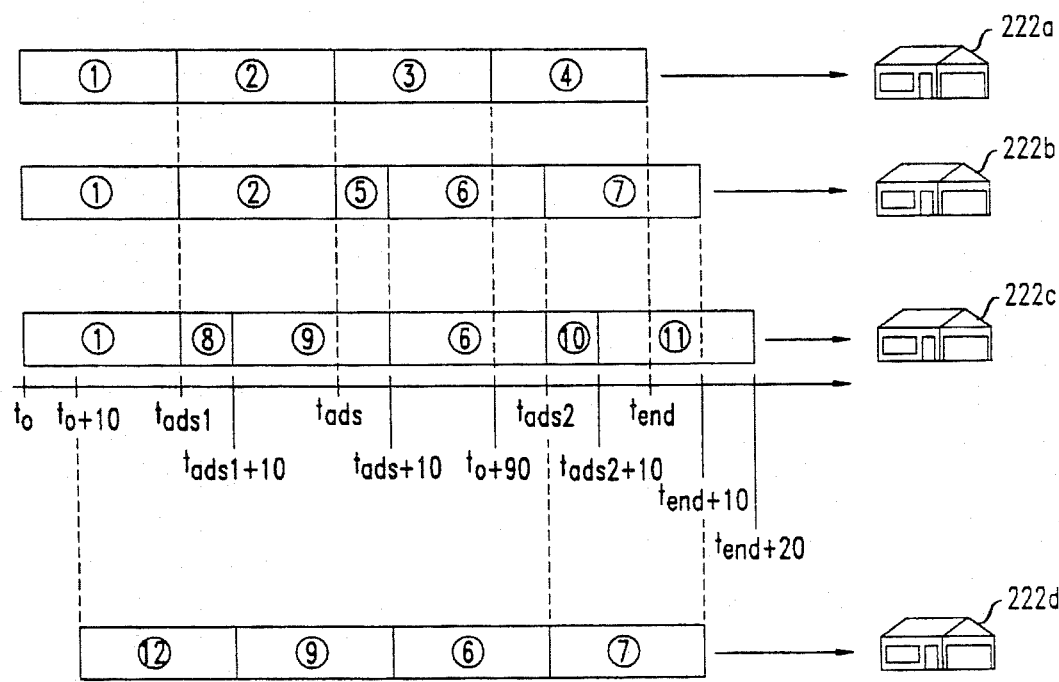
FIG. 4 shows an example of shows for a number of users assembled by the present invention.

FIG. 4 depicts a show being assembled for each of a plurality of interactive services subscriber locations 222a, 222b, and 222c. This concept is described in U.S. patent application Ser. No. 07/965,493 entitled "Interactive Television Multicasting" filed Oct. 23, 1992 with reference to its FIG. 4. At each interactive subscriber location 222a, 222b, and 222c, a converter is present. The converter is described in U.S. patent application Ser. No. 07/965,492 entitled "Interactive Television Converter" filed Oct. 23, 1992. Each converter can be enabled to receive more than one virtual channel at any given time. The circled numbers in FIG. 4 relate to virtual channel numbers.

The concept of a virtual channel will now be briefly explained. However, more detailed discussions of virtual channels are in the above references such as U.S. patent application Ser. No. 08/056,974 entitled "System For Composing Multimedia Signals For Interactive Television Services" filed May 3, 1993. In one embodiment, there are two different types of packets, data packets and control packets. Each packet transmitted through the network is comprised of header information and control information. The header information defines a "virtual channel" in which the packet is deemed to be transmitted. Thus, although one may be sequentially displaying packets from a plurality of different virtual channels, the virtual channels are transparent to the viewer because the viewer is under the impression that only one channel is being viewed.

Still referring to FIG. 4, assume a number of interactive services subscriber locations 222a, 222b, and 222c desire engage in VOD. Assume further that viewers at interactive services subscriber locations 222a, 222b, and 222c desire to view the same video beginning at time $t_0$ and desire no commercials, ten minutes of commercials, and twenty minutes of commercials, respectively. Assume further that the beginning of the desired video is available on virtual channel 1. Viewers at interactive services subscriber location 222a will receive virtual channel 1, virtual channel 2, virtual channel 3, and virtual channel 4 during times $t_0$ to $t_{ads1}$, $t_{ads1}$ to $t_{ads}$, $t_{ads}$ to $t_{0+90}$, and $t_{0+90}$ to $t_{end}$, respectively, wherein the time to show the desired video is represented by the difference between $t_0$ and $t_{end}$ and wherein the VOD is assumed to be 120 minutes in length (due to the location of $t_{0+90}$). Viewers at interactive services subscriber location 222b will receive virtual channel 1, virtual channel 2, virtual channel 5, virtual channel 6, and virtual channel 7 during times $t_0$ to time $t_{ads1}$, $t_{ads1}$ to $t_{ads}$, $t_{ads}$ to $t_{ads+10}$, $t_{ads+10}$ to $t_{ads2}$, and $t_{ads2}$ to $t_{end+10}$, respectively. Viewers at interactive services subscriber location 222c will receive virtual channel 1, virtual channel 8, virtual channel 9, virtual channel 6, virtual channel 10, and virtual channel 11 during times $t_0$ to $t_{ads1}$, $t_{ads1}$ to $t_{ads1+10}$, $t_{ads1+10}$ to $t_{ads+10}$, $t_{ads+10}$ to $t_{ads2}$, $t_{ads2}$ to $t_{ads2+10}$, and $t_{ads2+10}$ to $t_{end+20}$, respectively. Thus, viewers at location 222a may complete viewing the VOD 10 minutes before those at location 222b and twenty minutes before those at location 222c.

The timing schemes used in order to provide locations 222a, 222b, and 222c with their respective desired amount of advertisements will now be described. Assume the VOD, without any advertisements, is 120 minutes in duration. Assume further that locations 222a, 222b, and 222c all requested that the VOD begin at an identical time, $t_0$. Assume further that time $t_{ads2+10}$ is 110 minutes past time $t_0$, or $t_{0+110}$. In this case, viewers at location 222a will view the $111^{th}$ minute of the VOD from time $t_{ads2+10}$ to time $t_{ads2+11}$. Viewers at location 222b will view the $101^{st}$ minute of the VOD from time $t_{ads2+10}$ to time $t_{ads2+11}$. This is because viewers at location 222b have viewed ten minutes of advertisements (from time $t_{ads}$ to time $t_{ads+10}$) within the first 110 minutes and thus, have only viewed 100 minutes of the VOD. Viewers at location 222c will view the $91^{st}$ minute of the VOD from time $t_{ads2+10}$ to time $t_{ads2+11}$. This is because viewers at location 222c have viewed twenty minutes of advertisements (from time $t_{ads1}$ to time $t_{ads1+10}$ and from time $t_{ads2}$ to time $t_{ads2+10}$) within the first 110 minutes and thus, have only viewed ninety minutes of the VOD.

Initially, the timing scheme described above appears to present difficulty due to creating staggered playing times for a single VOD. Staggered playing times refers to instances wherein viewers at more than one location, e.g., 222a–222c, starts a VOD at the same time (unlike staggered starting times) but do not finish at the same time due to some factor (e.g., differing amounts of advertising desired at different locations). However, those skilled in the art will realize that the concept of staggered starting times, as described in U.S. patent application Ser. No. 07/965,493 entitled "Interactive Television Multicasting" filed Oct. 23, 1992 with particular reference to FIGS. 5 and 6, may be applied to staggered playing times within a VOD as in the above example. For example, if the VOD was shown every ten minutes, viewers at location 222b could be transferred to receive the same signals as viewers at a different location, e.g., 222d, that requested no advertisements and also requested to begin the VOD at time $t_{0+10}$. This is because at time $t_{0+110}$, viewers at location 222d will begin to view the 101$^{st}$ minute of the VOD just like viewers at location 222b (because viewers at location 222d will have seen 100 minutes total [$t_{0+110}$ minus $t_{0+10}$] without any advertisements).

The VOD application of the present invention described above is only by way of example. Those skilled in the art will realize that the VOD application may be modified from the above example in a number of ways including, but not limited to, involving more or fewer viewers for the same video, involving more or fewer viewers for different videos, involving different length advertising segments (e.g., four five minute segments instead of two ten minute segments for location 222c), and/or providing the VOD to non-viewers (e.g., a VCR) if legally permissible.

The VOD application of the present invention may also utilize a feature wherein the viewer is notified that an upcoming set of advertisements is about to be shown in, e.g., two minutes. The viewer may also be supplied with the length of time needed to view the upcoming set of advertisements (e.g., five minutes). The viewer may then be prompted for a response as to whether the viewer desires to "cancel" that set of advertisements. The ITV system 200 would then react according to the response.

The VOD application of the present invention may also be used to identify a set of shows transmitted on behalf of a subscriber to interactive television services during a billing period. Typically, the billing period would be monthly. Each VOD could be charged to an account of the interactive services subscriber locations, e.g., 222a–222d, based upon the amount of advertising viewed with each VOD. Typically, the more advertising presented, the lower the charge for the VOD. Thus, in the above example, the accounts corresponding to locations 222a through 222d may be billed $5.00, $4.00, $3.00, and $5.00, respectively, for the requested VOD service provided.

Further, the present invention is not limited to VOD applications and may, in fact, be utilized by a subscriber that does not use request a VOD. For example, a provider of interactive services may have three basic monthly rates. A first rate would be charged to those accounts indicating a desire for no advertisements, regardless of whether they are requesting a sporting event, a re-run of a situation comedy, the news, etc. . . . . A second rate would be charged to those accounts indicating a desire to view a minimal amount of advertisements. A third rate would be charged to those accounts indicating a desire to watch a more than minimal amount of advertisements. In this situation, the first rate would be the highest monthly rate and the third rate would be the lowest monthly rate. The rate could be adjusted up or down if a viewer at the interactive services subscriber location indicates that for a particular show or time frame, an amount of advertisements different than the "default" monthly amount is desired. The charge to the account could, for example, be adjusted on a pro-rata basis between, e.g., the first rate and the second rate. Thus, a requested show need not be limited to a VOD but may include simply turning on one's ITV to a sporting event, a re-run of a situation comedy, the news, etc. . . . .

Figure 5:
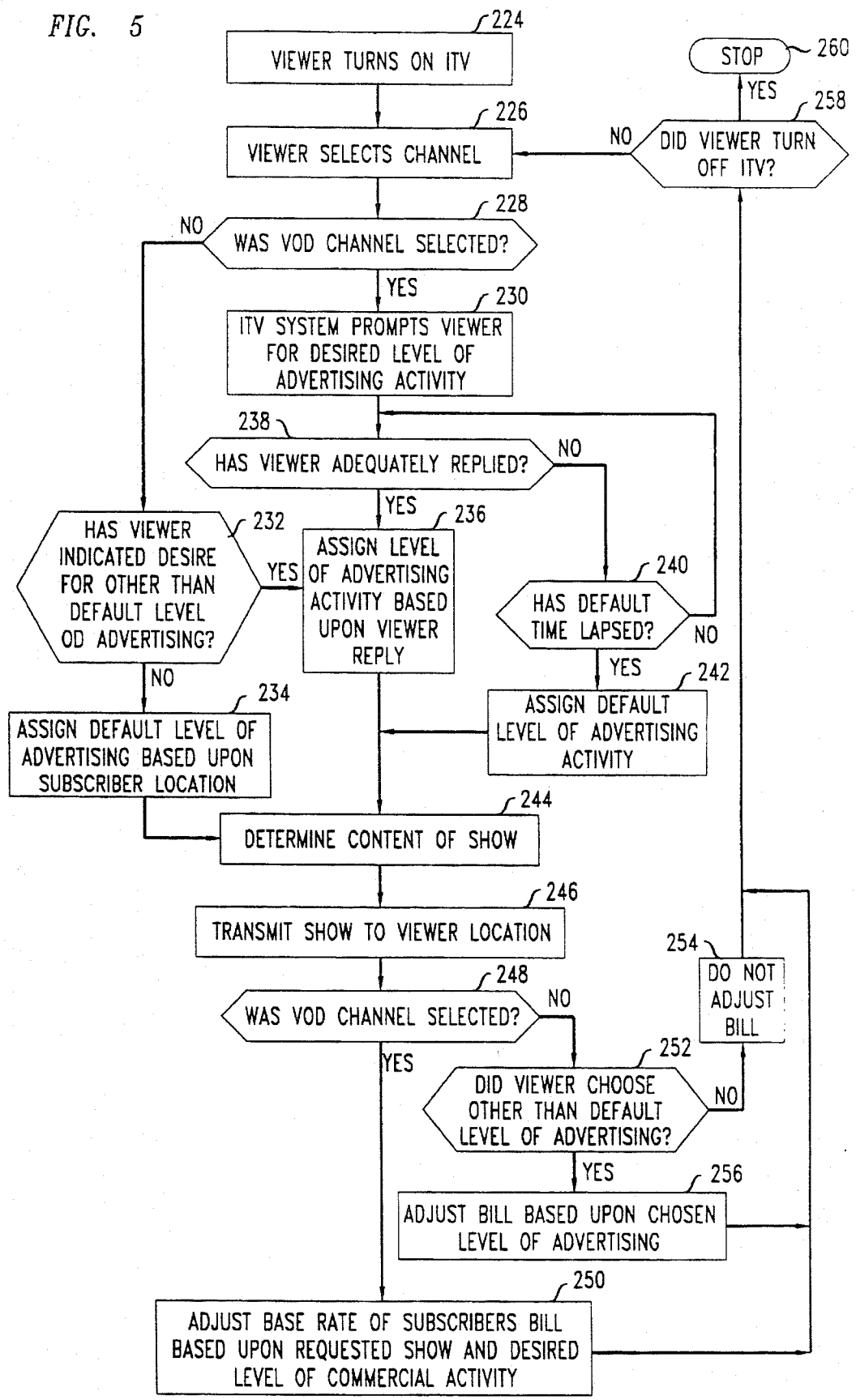
FIG. 5 shows a simplified version of a flow chart that gives an example of how the amount of advertisements is determined.

Regardless of whether the present invention is used in a VOD application or otherwise, FIG. 5 shows a simplified version of a flow chart that gives an example of how the amount of advertisements is determined. In fact, it also shows an example of how a subscriber's bill may be adjusted based upon shows viewed. Box 224 indicates that a viewer has turned on an ITV. Box 226 indicates that the viewer has selected a channel. Decision box 228 determines whether the viewer has selected a VOD channel. If so, the viewer is prompted for a desired level of commercial activity as shown in box 230. If not, decision box 232 determines if the viewer has indicated a desire for a level of advertising other than the default level for that FIG. 5 shows a simplified version of a flow chart that gives an example of how a subscriber's bill amount is determined. This may be done in a number of ways. One example would be to prompt the viewer for any desired changes. Another example would be to only change the default level if the viewer enters a command without being prompted. If the default level is applicable, box 234 assigns this level. Otherwise, box 236 assigns the level of advertising activity based upon the viewer reply. If the VOD channel is selected, decision box 238 determines whether the viewer has adequately responded to the prompt from decision box 230. If the viewer does not adequately respond within a predetermined amount of time (e.g., thirty seconds), decision box 240 and box 242 assign a default level of advertising to be viewed with the requested show. However, if the viewer makes an adequate response, box 236 assigns the level of advertising activity based upon the viewer reply. Next, boxes 244 and 246 determine the content of the show and transmit it to the interactive television services subscriber location, e.g., 222a. Next, billing for a VOD is determined by boxes 248 and 250. However, if the VOD channel was not selected, billing is determined by boxes 252, 254, and 256. Finally, boxes 258 and 260 are shown to account for the viewer selecting another channel (or keeping tuned to the same channel for the next show) or turning off the ITV, respectively. Those skilled in the art will realize that many modifications may be made to the above description.

Although the invention has been described with respect to an ITV environment running a VOD application, those skilled in the art will realize that the show may be anything that is requested. This includes, but is not limited to, such things as audio-visual shows, interactive shows, audio shows, shopping services, transactional shows, etc. . . . .

We claim:

1. A method of sending a set of signals to an interactive service subscriber location, the method comprising:
   (a) prompting a user at the interactive service subscriber location to enter a desired level of advertising activity;
   (b) waiting a predetermined amount of time for a response from the user; and
   (c) after the predetermined amount of time has elapsed, assigning a default entry to the desired level of advertising activity;
   (d) based upon the desired level of advertising activity, selecting a set of advertisements; and
   (e) sending to the interactive service subscriber location, the set of signals representing a program and the set of advertisements.

* * * * *